United States Patent
Gu et al.

(10) Patent No.: US 6,601,767 B1
(45) Date of Patent: *Aug. 5, 2003

(54) AMBIENT LIGHT SENSING APPARATUS AND METHOD FOR A PRODUCE DATA COLLECTOR

(75) Inventors: Yeming Gu, Suwanee, GA (US); Daniel B. Seevers, Duluth, GA (US)

(73) Assignee: NCR Corporation, Dayton, OH (US)

( * ) Notice: Subject to any disclaimer, the term of this patent is extended or adjusted under 35 U.S.C. 154(b) by 409 days.

This patent is subject to a terminal disclaimer.

(21) Appl. No.: 09/640,031

(22) Filed: Aug. 16, 2000

(51) Int. Cl.[7] ................................................ G06K 7/10
(52) U.S. Cl. .......................... 235/462.01; 235/462.11; 235/462.14; 235/462.26; 235/462.06; 356/419; 356/326; 356/328
(58) Field of Search .................... 235/462.01, 462.11, 235/462.14, 462.25; 356/326, 328

(56) References Cited

U.S. PATENT DOCUMENTS

| | | | |
|---|---|---|---|
| 4,693,330 A | 9/1987 | Uchimura et al. ............ 177/25 |
| 5,003,600 A * | 3/1991 | Deason et al. ................ 380/54 |
| 5,546,475 A | 8/1996 | Bolle et al. .................. 382/190 |
| 5,680,220 A * | 10/1997 | Delignieres et al. ........ 356/406 |
| 5,808,286 A * | 9/1998 | Nukui et al. ............ 235/472.01 |
| 5,867,265 A | 2/1999 | Thomas ...................... 356/328 |
| 6,075,594 A * | 6/2000 | Thomas et al. ............. 356/328 |
| 6,155,489 A * | 12/2000 | Collins, Jr. et al. ..... 235/462.01 |
| 6,158,662 A * | 12/2000 | Kahn et al. ............ 235/472.01 |
| 6,332,573 B1 * | 12/2001 | Gu et al. ............... 235/462.06 |
| 6,345,765 B1 * | 2/2002 | Wiklof ................. 235/472.01 |
| 6,373,574 B1 * | 4/2002 | Gu et al. .................... 356/419 |

* cited by examiner

Primary Examiner—Michael G. Lee
Assistant Examiner—Ahshik Kim
(74) Attorney, Agent, or Firm—Paul W. Martin

(57) ABSTRACT

An ambient light sensing apparatus and method for a produce data collector which minimize false triggering of produce data collection. The apparatus includes an image capture device which has a first receiving angle for incident light through an aperture in the produce data collector which is larger than a second receiving angle of a collector within the produce data collector which collects produce data.

12 Claims, 5 Drawing Sheets

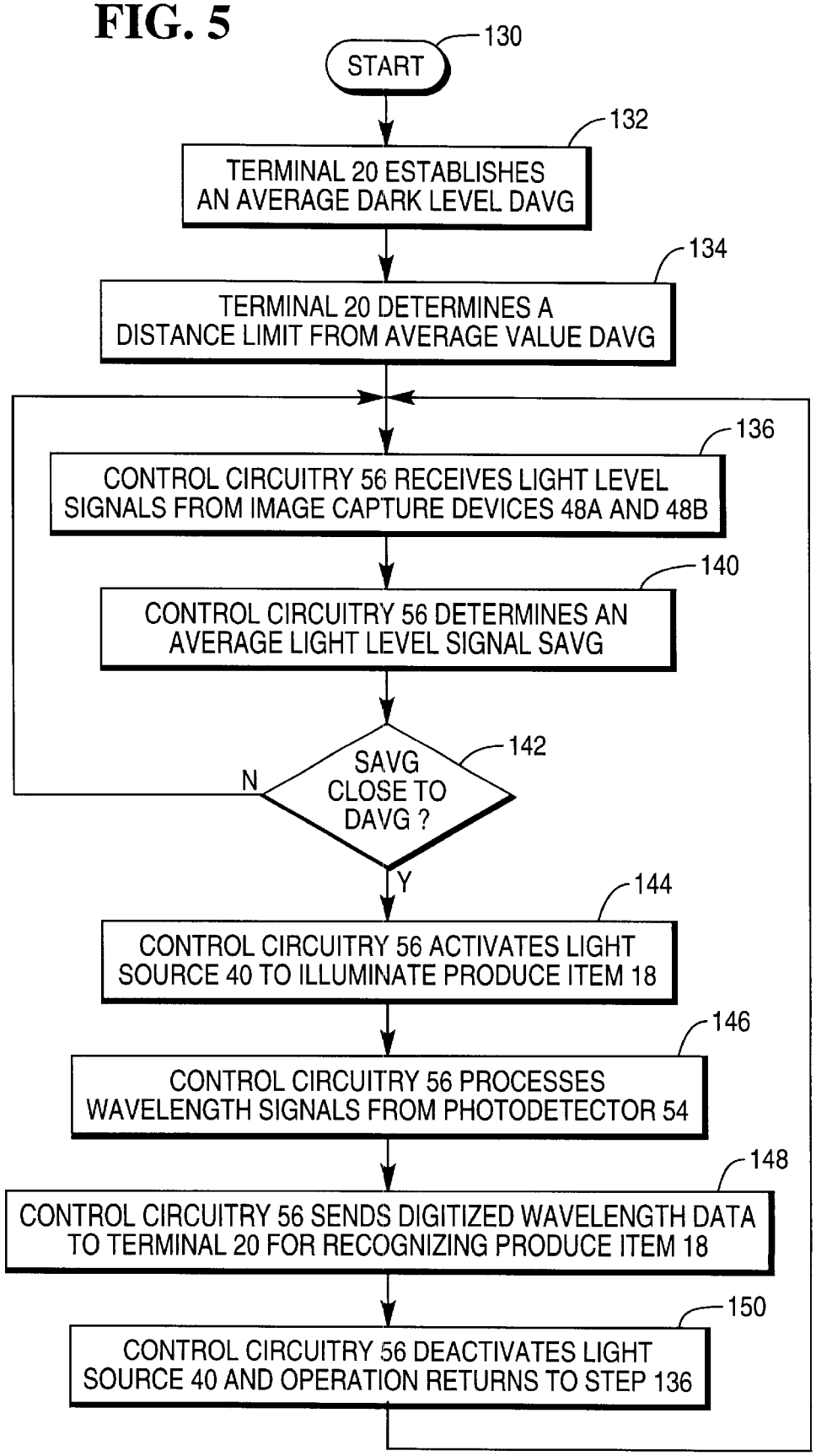

AMBIENT LIGHT SENSING APPARATUS AND METHOD FOR A PRODUCE DATA COLLECTOR

CROSS-REFERENCE TO RELATED APPLICATIONS

The present invention is related to the following commonly assigned and co-pending U.S. application:

"A Produce Data Collector And A Produce Recognition System", filed Nov. 10, 1998, invented by Gu, and having a Ser. No. 09/189,783.

"Produce Data Collector And Texture Data Collection Method", filed Aug. 16, 2000, invented by Gu, and having a Ser. No. 09/640,025.

BACKGROUND OF THE INVENTION

The present invention relates to product checkout devices and more specifically to ambient light sensing apparatus and method for a produce data collector.

Bar code readers are well known for their usefulness in retail checkout and inventory control. Bar code readers are capable of identifying and recording most items during a typical transaction since most items are labeled with bar codes.

Items which are typically not identified and recorded by a bar code reader are produce items, since produce items are typically not labeled with bar codes. Bar code readers may include a scale for weighing produce items to assist in determining the price of such items. But identification of produce items is still a task for the checkout operator, who must identify a produce item and then manually enter an item identification code. Operator identification methods are slow and inefficient because they typically involve a visual comparison of a produce item with pictures of produce items, or a lookup of text in table. Operator identification methods are also prone to error, on the order of fifteen percent.

A produce data collector disclosed in the co-pending application includes a spectrometer. The spectrometer preferably includes a linear variable filter (LVF) and a linear diode array (LDA), which capture spectral information about a produce item. In operation, an operator places a produce item on a window of the produce data collector, a light source illuminates the produce item through the window, and the produce data collector captures the spectrum of the diffuse reflected light from the produce item.

To improve system efficiency and prolong the life of the light source, it is highly desirable to operate the produce data collector in a "flashing" mode, such that the light source is only turned on while an object is in place on the window and while spectral data is being captured. Triggering may be manual or automatic, with automatic triggering being the preferred choice. As disclosed in the co-pending application, manual triggering envisions operator intervention to operate a switch or initiate execution of a software command. Automatic triggering may be initiated in response to a drop in ambient light entering the produce data collector.

However, ambient light sensing methods may not always be able to distinguish between an item which is on the window and an item which is above the window. Thus, false triggering may occur during movement of the item towards the window.

Therefore, it would be desirable to provide ambient light sensing apparatus and method for a produce data collector which provides more accurate triggering of data capture.

SUMMARY OF THE INVENTION

In accordance with the teachings of the present invention, ambient light sensing apparatus and method for a produce data collector are provided.

The apparatus includes an image capture device which has a first receiving angle for incident light through an aperture in the produce data collector which is larger than a second receiving angle of a collector within the produce data collector which collects produce data.

A method of activating a produce data collector includes the steps of determining an average dark level with an aperture in the produce data collector covered, receiving light signals from an image capture device in the produce data collector, determining an average light level, comparing the average dark level to the average light level, and if the average light level is within a predetermined distance of the average dark level, activating the produce data collector.

It is accordingly an object of the present invention to provide ambient light sensing apparatus and method for a produce data collector.

It is another object of the present invention to provide ambient light sensing apparatus and method for a produce data collector which provide more accurate triggering of data capture.

It is an other object of the present invention to provide ambient light sensing apparatus and method for a produce data collector which employs pinhole cameras to more accurately sense a drop in ambient light.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 5 is a flow diagram illustrating the method of the present invention.

DETAILED DESCRIPTION OF THE PREFERRED EMBODIMENT

Figure 1:
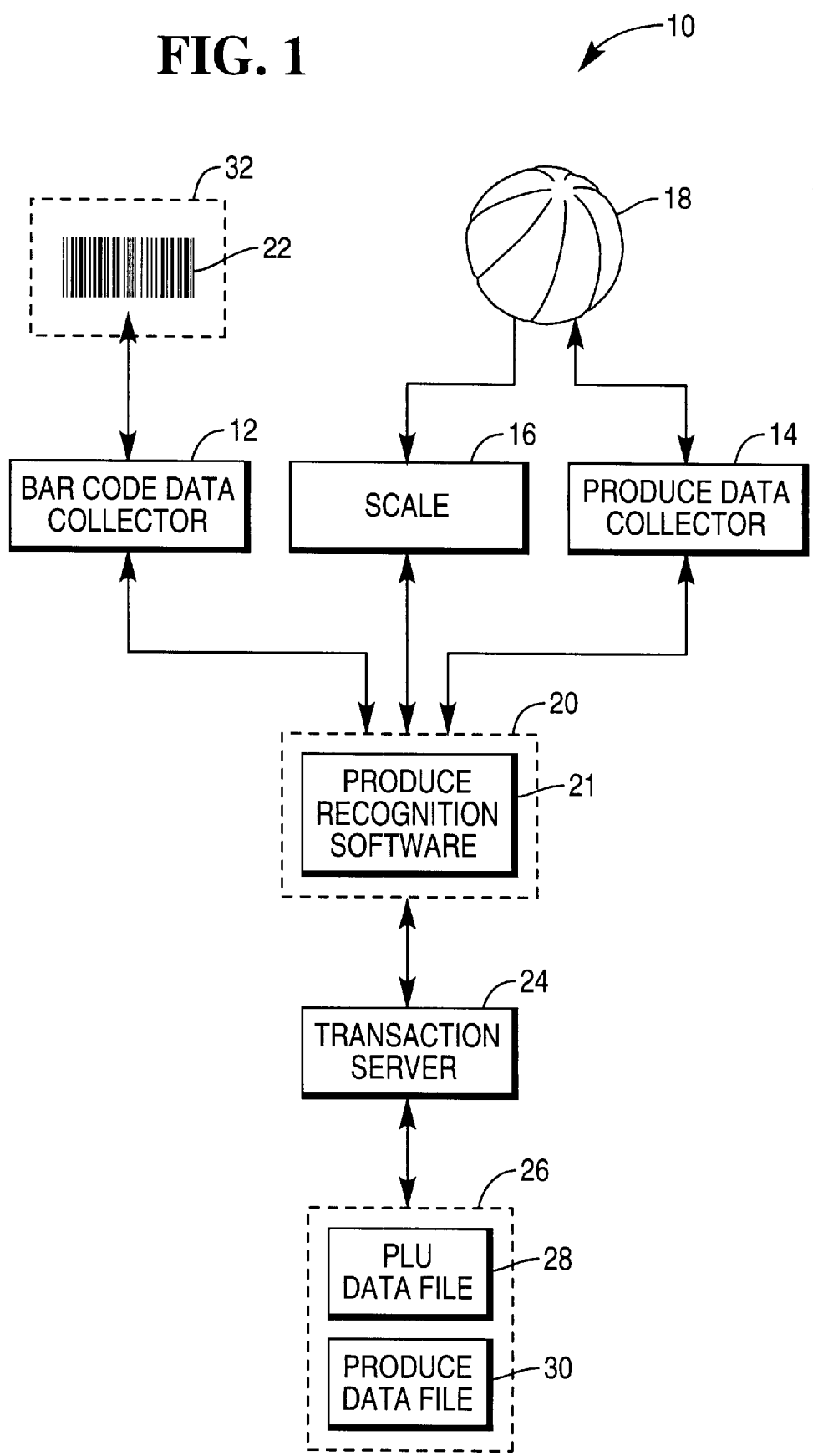
FIG. 1 is a block diagram of a transaction processing system including the produce data collector of the present invention.

Referring now to FIG. 1, transaction processing system 10 includes bar code data collector 12, produce data collector 14, and scale 16.

Bar code data collector 12 reads bar code 22 on merchandise item 32 to obtain an item identification number, also know as a price look-up (PLU) number, associated with item 32. Bar code data collector 12 may be any bar code data collector, including an optical bar code scanner which uses laser beams to read bar codes. Bar code data collector 12 may be located within a checkout counter or mounted on top of a checkout counter.

Produce data collector 14 collects data for produce item 18 or any other non-barcoded merchandise item. Such data preferably includes spectrum and texture data. Reference produce data is collected and stored within produce data file 30. During a transaction, operation of produce data collector 14 may be initiated automatically or manually.

Scale 16 determines a weight for produce item 18. Scale may be located at a produce identification and weigh station. Scale 16 may also be integrated into bar code data collector 12. Scale 16 is preferably coupled to transaction terminal 20 via a serial or network connection. Weight information may also be manually entered into terminal 20.

In the case of bar coded items, transaction terminal 20 obtains the item identification number from bar code data collector 12 and retrieves corresponding price information from PLU data file 28 through transaction server 24.

In the case of non-bar coded produce items, transaction terminal 20 executes produce recognition software 21 which obtains produce characteristics from produce data collector 14, identifies produce item 18 by comparing produce data in produce data file 30 with collected produce data, and retrieves an item identification number from produce data file 30. Transaction terminal 20 obtains a corresponding price from PLU data file 28 following identification. Transaction terminal 20 uses weight information from scale 16 to determine total price.

In an alternative embodiment, identification of produce item 18 may be handled by transaction server 24. Transaction server 24 receives collected produce characteristics and compares them with produce data in produce data file 30. Following identification, transaction server 24 obtains a price for produce item 18 and forwards it to transaction terminal 20. Either transaction server 24 or transaction terminal 20 may determine a total price using the weight information from scale 16.

PLU data file 28 and produce data file 30 are stored within storage medium 26, but either may also be located instead at transaction terminal 20, or bar code data collector 12.

To assist in proper identification of produce items, produce recognition software 21 may additionally display candidate produce items for operator verification. Produce recognition software 21 preferably arranges the candidate produce items in terms of probability of match and displays them as text and/or color images on an operator display of transaction terminal 20. The operator may accept the most likely candidate returned by or override it with a different choice.

Figure 2:
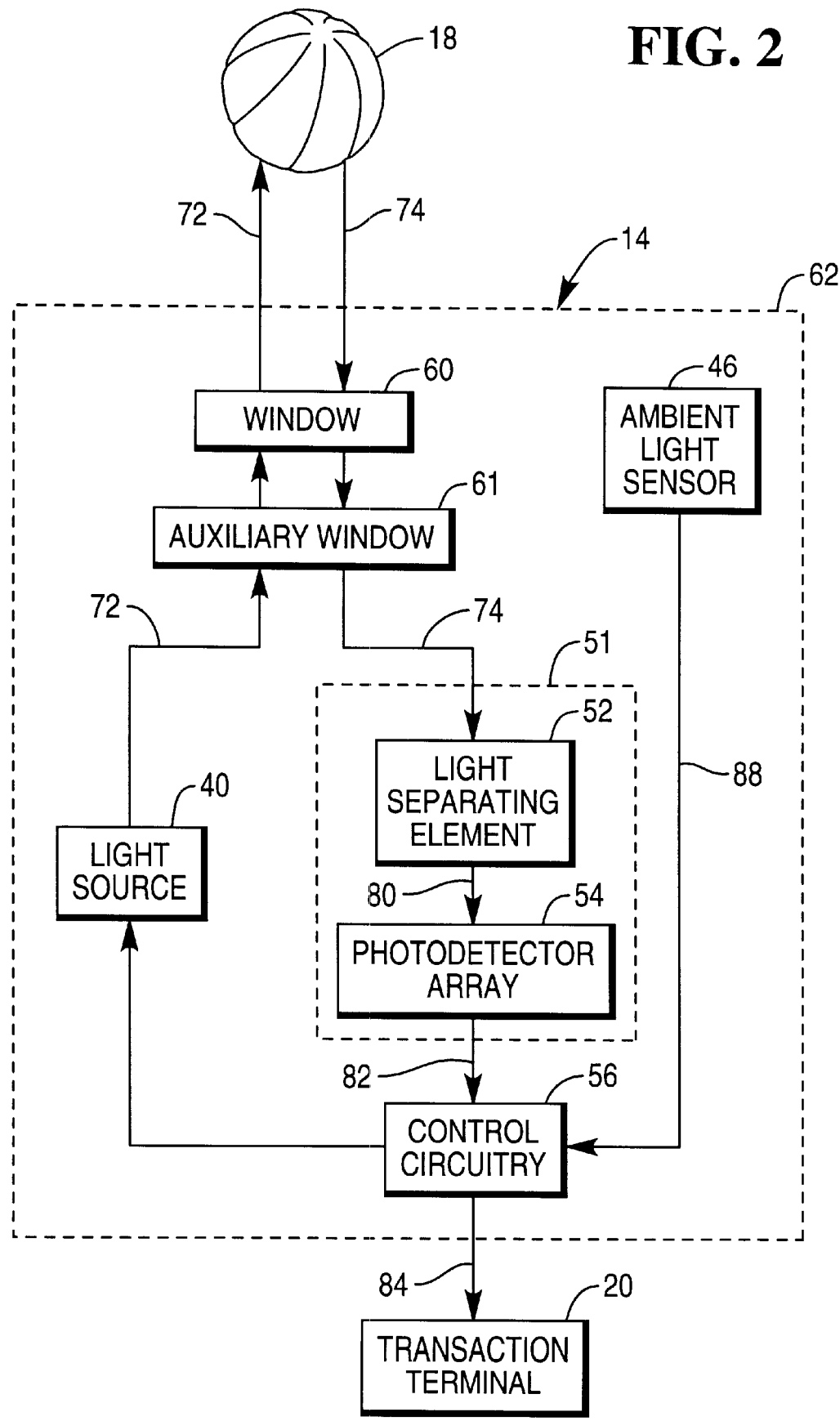
FIG. 2 is a block diagram of the produce data collector.

Turning now to FIG. 2, produce data collector 14 primarily includes light source 40, ambient light sensor 46, spectrometer 51, control circuitry 56, transparent window 60, auxiliary transparent window 61, and housing 62.

Light source 40 produces light 70. Light source 40 preferably produces a white light spectral distribution, and preferably has a range from four hundred 400 nm to 700 nm, which corresponds to the visible wavelength region of light.

Light source 40 preferably includes one or more light emitting diodes (LEDs). A broad-spectrum white light producing LED, such as the one manufactured by Nichia Chemical Industries, Ltd., is preferably employed because of its long life, low power consumption, fast turn-on time, low operating temperature, good directivity. Alternate embodiments include additional LEDs having different colors in narrower wavelength ranges and which are preferably used in combination with the broad-spectrum white light LED to even out variations in the spectral distribution and supplement the spectrum of the broad-spectrum white light LED.

Ambient light sensor 46 senses the level of ambient light through windows 60 and 61 and sends signals 88 to control circuitry 56.

Spectrometer 51 includes light separating element 52, and photodetector array 54.

Light separating element 52 splits light 76 in the preferred embodiment into light 80 of a continuous band of wavelengths. Light separating element 52 is preferably a linear variable filter (LVF), such as the one manufactured by Optical Coating Laboratory, Inc., or may be any other functionally equivalent component.

Photodetector array 54 produces waveform signals 82 containing spectral data. The pixels of the array spatially sample the continuous band of wavelengths produced by light separating element 52, and produce a set of discrete signal levels. Photodetector array 54 is preferably a linear photodiode array, or complimentary metal oxide semiconductor (CMOS) array, but could also be a CCD array.

Other types of collectors besides spectrometers are also envisioned. All collectors which use an aperture to locate produce item 18 could benefit from ambient light sensor 46.

Control circuitry 56 controls operation of produce data collector 14 and produces spectral signals 84. For this purpose, control circuitry 56 includes an analog-to-digital (A/D) converter. A twelve bit A/D converter with a sampling rate of 22–44 kHz produces acceptable results.

Control circuitry 56 also receives signals from ambient light sensor 46 in order to initiate operation. In response to signals 88, control circuitry 56 waits for ambient light levels to fall to a minimum level before turning on light source 40. Ambient light levels fall to a minimum level when produce item 18 covers window 60. After control circuitry 56 has received spectral signals 82 containing produce data, control circuitry 56 turns off light source 40 and waits for ambient light levels to increase before returning to waiting for the dark state. Ambient light levels increase after produce item 18 is removed from window 60.

Housing 62 contains light source 40, ambient light sensor 46, light separating element 52, photodetector array 54, control circuitry 56, and auxiliary transparent window 61. Housing 62 additionally contains transparent window 60 when produce data collector 14 is a self-contained unit. When produce data collector 14 is mounted within the housing of a combination bar code reader and scale, window 60 may be located in a scale weigh plate instead.

Transparent window 60 is mounted above auxiliary transparent window 61. Windows 60 and 61 include an anti-reflective surface coating to prevent light 72 reflected from windows 60 and 61 from contaminating reflected light 74.

In operation, an operator places produce item 18 on window 60. Control circuitry 56 turns on light source 40. Light separating element 52 separates reflected light 74 into different wavelengths to produce light 80 of a continuous band of wavelengths. Photodetector array 54 produces waveform signals 82 containing produce data. Control circuitry 56 produces digitized produce data signals 84 which it sends to transaction terminal 20. Control circuitry 56 turns off light source 40.

Transaction terminal 20 uses produce data in digitized produce data signals 84 to identify produce item 18. Here, produce data consists of digitized waveforms. Transaction terminal 20 compares the digitized waveforms to a library of digitized waveforms stored within produce data file 30.

After identification, transaction terminal 20 obtains a unit price from PLU data file 28 and a weight from scale 16 in order to calculate a total cost of produce item 18. Transaction terminal 20 enters the total cost into the transaction.

Figure 3:
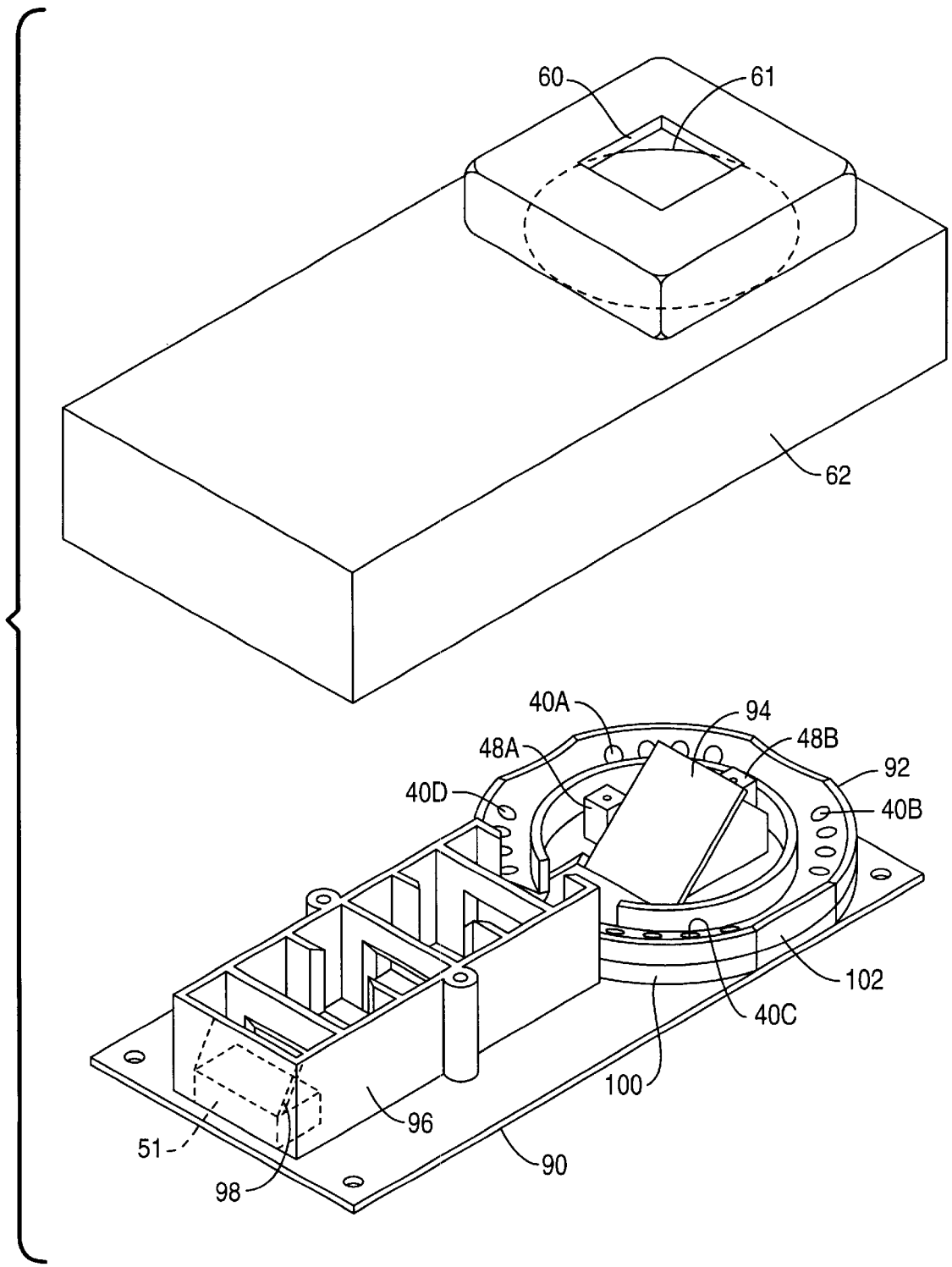
FIG. 3 is a perspective view of the produce data collector.

Turning now to FIG. 3, produce data collector 14 is illustrated in more detail.

Produce data collector 14 additionally includes printed circuit board 90, light source assembly 92, turning mirror 94, stray light baffle 96, and turning mirror 98.

Printed circuit board 90 contains control circuitry 56 and forms a base for ambient light sensor 46, spectrometer 51, light source assembly 92, turning mirror 94, stray light baffle 96, and turning mirror 98. Printed circuit board 90 fastens to housing 62.

Light source assembly 92 includes light source 40, lower light source mount 100, and upper light source mount 102.

Light source 40 preferably includes a number of white LEDs which are arranged close to window 60 and in direct line of sight of window 60. Light source mount 92 is designed such that each individual LED is pointed at the top surface of window 60 so that there is uniform luminosity over the entire top surface of window 60 for illuminating produce item 18. The LEDs are spectrally matched in groups, and their placement and orientation achieves optimal uniformity in both spectrum and luminosity across the illuminated surface area.

The illustrated embodiment includes sixteen white LEDs arranged in four groups 40A, 40B, 40C, and 40D of four LEDs on four sides of lower light source mount 100. Other arrangements are also envisioned by the present invention, such as two or four groups of four and eight LEDS. To achieve higher system efficiency, LEDs with a narrow, concentrated beam are preferred.

Lower light source mount 100 is generally circular in shape. This arrangement supports the LEDs in the preferred arrangement and orientation. Lower light source mount 100 connects mechanically and electrically to printed circuit board 90.

Upper light source mount 102 is also generally circular in shape and connects mechanically in mating relationship to lower light source mount 100. Upper light source mount 102 mechanically holds the LEDs in a preferred orientation for even illumination across the area of window 60.

Turning mirror 94 routes reflected light 74 from produce item 18 through stray light baffle 96 towards turning mirror 98. Deflector mirror 94 is mounted at about a forty-five degree.

Ambient light sensor 46 includes a number of image capture devices, 48A and 48B, which are mounted adjacent turning mirror 94. Image capture devices 48A and 48B are preferably pinhole cameras.

Stray light baffle 96 minimizes the amount of stray light which reaches spectrometer 51. Stray light baffle 96 effectively establishes an entrance cone 110 (FIG. 4) from photodetector 54 through window 60. Only light oriented inside the solid angle defined by this cone can reach photodetector 54.

Turning mirror 98 directs reflected light 74 to spectrometer 51. Turning mirror 98 is mounted at about a forty-five degree angle.

Figure 4:
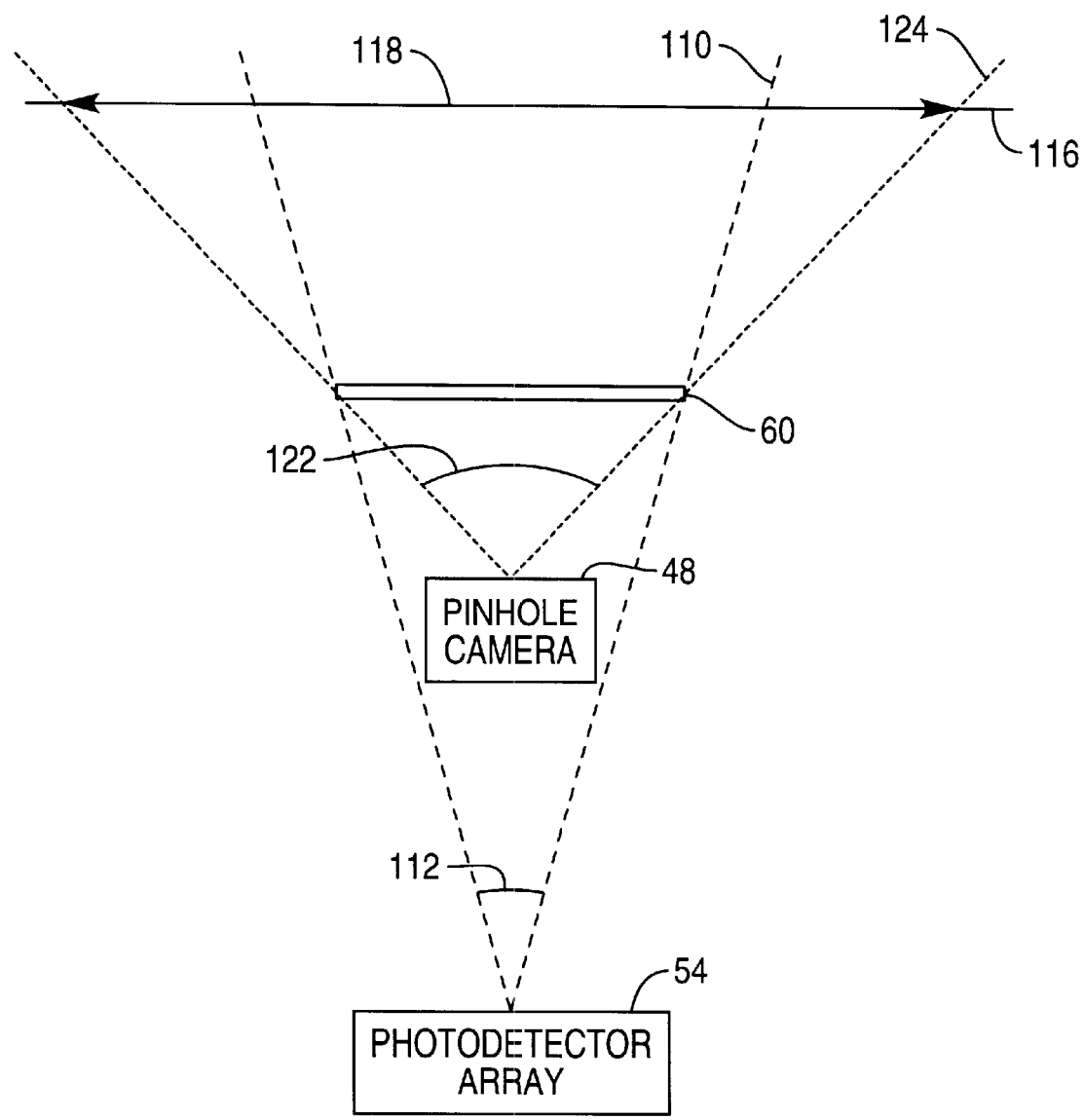
FIG. 4 is a diagrammatic view illustrating operation of the ambient light sensor.

Turning now to FIG. 4, operation of cameras 48A and 48B is explained in detail.

A pinhole camera is the simplest camera one can build. It does not require any lenses. The viewing angle 122 of the incident cone 124 of a pinhole camera is easily controlled by the distance from its pinhole to its imaging plane. Viewing angle 122 becomes larger when its pinhole is closer to its imaging plane. This viewing angle 122 can be significantly larger than the maximum conic angle 112 for incident rays allowed by spectrometer 51. To further simplify the system, a similar linear photodetector array is used with the pinhole camera to make up a simple one-dimensional camera. Such a camera can be easily controlled by the same control circuitry 56.

The one-dimensional pinhole camera looks at a narrow strip 118 on object plane 116. Object plane 116 moves towards window 60.

By using two one-dimensional pinhole cameras to look at two orthogonal directions, produce data collector 14 can sense the amount of blockage of ambient light in a wide viewing angle 122 in all four directions. If an object of finite size completely covers incident cone 110 of spectrometer 51, image capture devices 48A and 48B may still be able see ambient light in the wider cone 124. Thus, produce data collector 14 will not attempt to capture data unless certain criteria are satisfied as indicated below.

Turning now to FIG. 5, the method of the present invention is illustrated in detail beginning with START 130.

In step 132, control circuitry 56 establishes an average dark level $D_{avg}$. The spectral reading of a true dark level of the pinhole cameras is in general noisy but the average reading is stable in an environment of near constant temperature. For the pinhole cameras, the dark level is a noisy but relatively flat curve with an average value of $D_{avg}$. Average value $D_{avg}$ is determined by averaging a number of dark measurements, i.e., readings taken from the photodetector array with light source 40 turned off and window 60 completely covered. It can be expressed as $$D_{avg} = \frac{1}{n}\sum_{i=1}^{n}\left(\frac{1}{n_p}\sum_{j=1}^{n_p} D_{ij}\right), \tag{1}$$

where n is the number of measurements and $n_p$ is the number of pixels. Normally n is in the range of 4 to 6.

In step 134, control circuitry 56 determines a distance limit from average value $D_{avg}$. One measure of distance is standard deviation, $D_{std}$, for the average dark level, $D_{avg}$. Standard deviation $D_{std}$ can be approximated from the overall pixel noise N, $$D_{std} = \frac{N}{\sqrt{n_p}} \tag{2}$$

where $n_p$ is the total number of camera pixels involved in the averaging. For a pinhole camera with a signal-to-noise (S/N) ratio of 1000, and for control circuitry with a 12-bit A/D, the pixel noise is about 4 counts. For a one-dimensional pinhole camera with 128 pixels, $$D_{std} \sim 0.35.$$

The distance limit can be expressed as $$\Delta D_{max} = kD_{std}, \tag{3}$$

where k is a constant factor which can be determined empirically by the operator. In practical operations, few produce items can cover the window completely, various amounts of ambient light find their way into the incident cone 124. The normal range of k is about 3–30. Thus, the optimal value of k depends on the ambient brightness. For a given ambient light level, a higher k value makes triggering easier but also causes more false triggering.

In step 136, control circuitry 56 receives light level signals from image capture devices 48A and 48B.

In step 140, control circuitry 56 determines an average light level signal $S_{avg}$. To take full advantage of the imaging capability, average light level signal $S_{avg}$ may be a vector instead of a single value. For example, it could be from predefined multiple sections of the two linear detector arrays in the two pinhole cameras, 48A and 48B.

In step 142, control circuitry 56 determines whether the average light level signal $S_{avg}$ falls within the predetermined distance $\Delta D_{max}$ of the average dark level $D_{avg}$. If so, produce item 18 has been placed on window 60. Operation proceeds to step 144. If not, operation returns to step 136.

When $S_{avg}$ is a vector, distance $\Delta D_{max}$ is in general also a vector. It is still determined by equations (2) and (3), but with standard deviation $D_{std}$ being a vector and $n_p$ being the pixel numbers in various sections in the detector arrays. If all sections have the same number of pixels then distance $\Delta D_{max}$ is equivalent to a single value.

In the ideal case, when the incident cone 124 (FIG. 4) is completely blocked, one-dimensional pinhole cameras will see complete darkness. Therefore, with internal illumination off, if the measured average signal $S_{avg}$ is within the three-sigma range of the predetermined average dark level $D_{avg}$, i.e., if $$D_{avg} - 3D_{std} \leq S_{avg} \leq D_{avg} + 3D_{std}, \quad (4)$$

one can determine at 99.7% confidence level that window 60 is completely blocked by an object.

This criterion works fine for ideal situations, i.e., when a flat opaque object is placed right on top of window 60 and completely covers it. However, for rounded objects, the dark side is not completely dark due to scattered/reflected light from window 60, and for other ambient objects, when the object is not in full contact with window 60. Furthermore, for transparent or semi-transparent objects or objects having gaps, a small amount of ambient light will also reach photodetector 54. Therefore, instead of equation (4), the following equation is used to determine if there is an object on the window, $$S_{avg} \leq D_{avg} + \Delta D_{max} \text{ with } \Delta D_{max} = kD_{std}, \quad (5)$$

where k is usually much larger than 3. The lower limit for average signal $S_{avg}$ is unnecessary because the blockage of ambient light always causes a decrease in average signal $S_{avg}$.

However, with a fixed distance $\Delta D_{max}$, one can not tell if the object is still in motion. Therefore, after an object is sensed, i.e., equation (5) is satisfied, a dynamic value should be used to determine if the object is steady. During the wait mode, the system constantly takes readings from the ambient light detector. The dynamic value is determined by using the real time average of a predetermined number of previous readings, i.e., similar to equation (5), the following criterion is used, $$S_{avg} \leq D_{avg,t} + k' D_{std}, \quad (6)$$

with $$D_{avg,t} = \frac{1}{K} \sum_{i=1}^{K} S_{avg,t-i}. \quad (7)$$

Here, t is referring to the current reading and t-i refers to the previous i-th reading. In general, k' in equation (6) is much smaller than k in equation (6). Normally K is in the range of 2 to 10, depending on the integration time and the desired sensitivity to motion. All three values, k, k', and K, can be determined empirically at the system setup. A set of default values can be determined in the lab for a given system configuration.

For better motion sensing, one can alternatively take continuous readings with light source 40 on. The same equations (6) and (7) applies, except that now the current reading must be the (K+1)-th or later readings after the light source is turned on.

This combination of the two sensing schemes with fixed and dynamic values works well in practice. The fixed value determines if there is an object above the window; then the dynamic value is used to determine if the object is also stable above the window. This prevents most false triggering due to non-produce items moving across the window or produce item moving towards the window but not settled yet.

In step 144, control circuitry 56 activates light source 40 to illuminate produce item 18.

In step 146, control circuitry 56 processes spectral signals from photodetector 54.

In step 148, control circuitry 56 sends digitized spectral data to terminal 20 for recognizing produce item 18.

In step 150, control circuitry 56 deactivates light source 40 and operation returns to step 136.

Advantageously, ambient light sensor 46 dramatically improves triggering over previous methods by minimizing false triggering when produce item 18 is above rather than on top of window 60. While two simple one-dimensional image capture devices 48A and 48B are discussed here, a two-dimensional image capture devices may work just as well.

Although the invention has been described with particular reference to certain preferred embodiments thereof, variations and modifications of the present invention can be effected within the spirit and scope of the following claims. For example, the ambient light sensing apparatus may be used with other types of produce data collectors besides spectrometer-based produce data collectors.

We claim:

1. A produce data collector comprising:
    a spectrometer for obtaining spectral data from a produce item adjacent an aperture in the spectrometer, including a photodetector which has a first receiving angle for incident light through the aperture;
    an ambient light sensing apparatus including an image capture device having a second receiving angle which is larger than the first receiving angle; and
    control circuitry for operating the spectrometer when ambient light levels sensed by the ambient light sensing apparatus fall below a predetermined minimum level.

2. The produce data collector as recited in claim 1, wherein the image capture device comprises a pinhole camera.

3. The produce data collector as recited in claim 1, wherein the image capture device comprises first and second pinhole cameras arranged to receive ambient light from two orthogonal directions.

4. A produce recognition system comprising:
    a produce data collector including
        a light source for illuminating a produce item;
        a spectrometer for obtaining spectral data from a produce item adjacent an aperture in the spectrometer, including a photodetector which has a first receiving angle for incident light through the aperture;
        an ambient light sensing apparatus including an image capture device having a second receiving angle which is larger than the first receiving angle; and
        control circuitry for operating the light source and spectrometer when ambient light levels sensed by the ambient light sensing apparatus fall below a predetermined minimum level; and
    a computer which compares the spectral data with reference spectral data to determine a number of candidate identifications for the produce item.

5. The system as recited in claim 4, wherein the image capture device comprises a pinhole camera.

6. The system as recited in claim 4, wherein the image capture device comprises first and second pinhole cameras arranged to receive ambient light from two orthogonal directions.

7. A method of activating a produce data collector comprising the steps of:

determining an average dark level with an aperture in the produce data collector covered;

receiving light signals from an image capture device in the produce data collector;

determining an average light level;

comparing the average dark level to the average light level; and if the average light level is within a predetermined distance of the average dark level, activating the produce data collector.

8. The method as recited in claim 7, wherein the activating step comprises the substeps of:

activating a light source for illuminating a produce item; and capturing reflected light; and processing the reflected light for produce item information.

9. A method of identifying a produce item comprising the steps of:

determining an average dark level with an aperture in the produce data collector covered;

receiving light signals from an image capture device in the produce data collector;

determining an average light level;

comparing the average dark level to the average light level; and if the average light level is within a predetermined distance of the average dark level, activating the produce data collector, and comparing produce information obtained from the produce data collector with reference produce information to obtain a list of candidate identifications.

10. An ambient light sensing apparatus for a produce data collector comprising:

an image capture device which has a first receiving angle for incident light through an aperture in the produce data collector which is larger than a second receiving angle of a collector within the produce data collector which collects produce data.

11. The apparatus as recited in claim 10, wherein the image capture device comprises a pinhole camera.

12. The apparatus as recited in claim 10, wherein the image capture device comprises first and second pinhole cameras arranged to receive ambient light from two orthogonal directions.

* * * * *